United States Patent Office 3,549,641
Patented Dec. 22, 1970

3,549,641
PYRANO PYRIDINES AND PROCESS FOR THEIR PRODUCTION
Maximilian von Strandtmann, Rockaway Township, Marvin P. Cohen, New Milford, and John Shavel, Jr., Mendham, N.J., assignors to Warner-Lambert Pharmaceutical Company, Morris Plains, N.J., a corporation of Delaware
No Drawing. Filed June 28, 1966, Ser. No. 561,071
Int. Cl. C07d 99/04
U.S. Cl. 260—287                                  23 Claims

ABSTRACT OF THE DISCLOSURE

A class of pyrano pyridines of the formula:

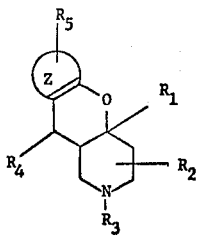

I wherein $R_1$ is diaralkylamino, lower alkyl aryl amino, hydroxy, dilower alkylamino, etc.; $R_2$ is hydrogen, lower alkyl, cycloalkyl, aryl and aralkyl; $R_3$ is hydrogen, lower alkyl, cycloalkyl, aryl and acyl; $R_4$ is hydrogen, lower alkyl, cycloalkyl and aryl; and Z is the aromatic nucleus.

These compounds are prepared by reacting a compound of the formula:

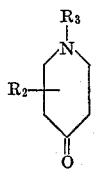

or the enamine derivative thereof formed from an amine of the formula:

with an amino alcohol compound of the formula:

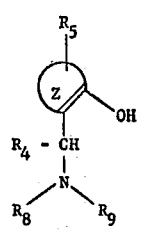

These compounds are useful as psychotropic agents.

---

This invention relates to novel heterocyclic compounds and relates more particularly to pyrano pyridines of the formula:

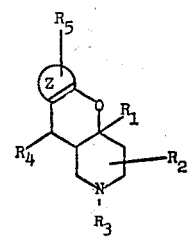

I wherein $R_1$ represents diaralkylamino, lower alkyl aryl amino, hydroxy, dilower alkylamino, pyrrolidino, morpholino, piperidino; $R_2$ represents hydrogen, lower alkyl, cycloalkyl, aryl and aralkyl; $R_3$ represents hydrogen, lower alkyl, cycloalkyl, aryl and acyl; $R_4$ represents hydrogen, lower alkyl, cycloalkyl and aryl; Z represents an aromatic nucleus such as benzene, pyridine, naphthalene, phenanthrene, isoquinoline and quinoline; and $R_5$ represents hydrogen, halogen, nitro, lower alkoxy, amino, dialkylamino, acylamino, lower alkyl and aryl.

In the above definitions for $R_1$, $R_2$, $R_3$, $R_4$ and $R_5$ the term "lower alkyl" represents an alkyl group containing from 1 to 6 carbon atoms such as methyl, ethyl, propyl, isopropyl, butyl, isobutyl and the like. The term "lower alkoxy" includes an alkoxy group containing from 1 to 6 carbon atoms such as methoxy, ethoxy, propoxy, isopropoxy, butoxy, isobutoxy and the like.

The aryl portion in the terms "aryloxy," "aralkoxy," "aralkyl" and "aryl" includes monocyclic as well as bicyclic aromatic nuclei such as phenyl, naphtho, isoquinolino and the like.

The term "acyl" is employed to designate a radical derived from a carboxylic acid.

The term "aromatic nucleus" includes compounds containing a homocyclic nucleus as well as compounds having a heterocyclic nucleus.

The term "halogen" includes the four halogens, i.e. chlorine, bromine, fluorine and iodine.

The symbols $R_1$, $R_2$, $R_3$, $R_4$, Z and $R_5$ used hereinafter have the same meaning as defined.

The present invention also includes within its scope novel processes for the production of these compounds.

The compounds of this invention exhibit chlorpromazine-like activity and are useful in conditions whenever chlorpromazine is indicated. Thus, for example, they are useful in mitigating conditions associated with emotional stress such as vomiting and hiccup.

Other compounds of this invention elicit imipramine-like central nervous system stimulations. These products may be used as antidepressant agents.

Doses of about 1 to 100 mg. several times daily are generally recommended to produce the desired central nervous system effects.

In use, the compounds of this invention may be combined with known pharmaceutical diluents such as lactose, starch, dicalcium phosphate and the like to form commonly employed dosage forms such as tablets or pills. They may also be dissolved in an isotonic solution suitable for parenteral injection.

Dosage forms known to the art such as sustained release tablets or liquids, capsules, suppositories and the like may also be prepared according to procedures known in the pharmaceutical art.

The compounds of this invention may be prepared by a number of procedures as follows:

PROCEDURE A

In accordance with this procedure a compound of the structure:

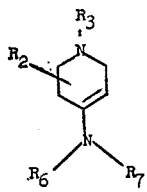

is heated with an equivalent amount of a compound of the structure

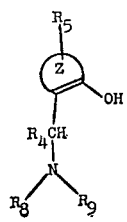

in dioxane at a temperature of from about 70 to 95° C. until no compound of the formula

is detectable which is formed as a byproduct of the reaction. At this point, water is added and the mixture is then heated at a temperature of about 90 to 98° C. for an additional period such as 60 to 70 minutes. The addition of water is omitted in the case when $R_1$ in the final product is an amine, i.e. dilower alkylamine, pyrrolidine, morpholine or piperidine. Compound of structure III may be used also in the form of its quaternary salt or the N-oxide derivatives.

The choice of solvent is nonessential and the reaction can be carried out in many other inert organic solvents such as toluene, xylene and the like.

The reaction which takes place during Procedure A is quite unexpected because it is generally known that phenolic Mannich bases of structure III above cannot be expected to alkylate compounds containing reactive methylene or methylidene groups such as in structure II above, because of their strong tendency towards dimerization. See for example H. Hellmann and G. Opitz, "α-Aminoalkylierung," Verlag Chemie G.m.b.H., Weinheim (1960), page 284; and F. Poppelsdorf and J. Holt, J. Chem. Soc., 1954, 4094.

PROCEDURE B

Procedure B involves the reaction of a compound of the structure IV:

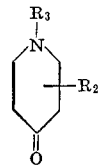

with a compound of the structure III above utilizing the same reaction conditions as described for Procedure A except that the step involving heating with water is entirely omitted.

Procedure B is limited to those cases where the final product $R_1$ does not include an amine.

PROCEDURE C

Procedure C is analogous to Procedure B except that no solvent is used and in addition the reaction is carried out at 150°.

The symbols $R_6$, $R_7$, $R_8$ and $R_9$ used in the above description, represent hydrogen, lower alkyl, aralkyl or aryl or taken together with nitrogen to which they are attached form a ring system such as piperidine, morpholine or pyrrolidine. The reaction products obtained in each of the above-described processes are worked up and recovered in accordance with procedures well known to the art.

The Mannich bases III used as the starting material are prepared by standard methods described in "α-Aminoalkylierung" by H. Hellmann and G. Opitz, Verlag Chemie G.m.b.H., Weinheim, 1960.

The enamines II used as the starting materials are prepared by standard methods according to G. Stork et al. (J. Am. Chem. Soc., 85, 207 (1963)) from amines such as dialkylamines, pyrrolidine, morpholine, piperidine and the like and from piperidine derivatives (compound IV).

The following examples are included in order further to illustrate the invention.

All temperatures referred to in these examples are given in degrees centigrade.

EXAMPLE 1

8,9,10,11,11a,12-hexahydro-10-methyl-7aH-naphtho[1',2':5,6]-pyrano[3,2-c]pyridin-7a-ol

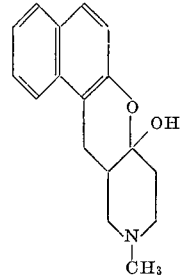

A solution of 10.05 g. of 1-dimethylaminomethyl-2-naphthol, and 5.65 g. of N-methyl-4-piperidone in 50 ml. of dioxane is refluxed for 4 days. The solvent is removed in vacuo and the residual gum recrystallized from ethyl acetate, M.P. 168–72°; yield 6.5 g. (48%); $\lambda_{max.}$ m$\mu$ ($\epsilon$) 231 (78,000), 265 (4,200), 276 (5,100), 317 (4,800), 331 (5,900); $\nu_{max.}$ 740 (ms.), 815 (s.), 985 (ms.), 1030 (s.), 1155 (s.), 1270 (ms.), 1510 (m.), 1600 (m.), 1625 (m.), cm.$^{-1}$.

*Analysis.*—Calcd. for $C_{17}H_{19}NO_2$ (percent): C, 75.81; H, 7.11; N, 5.20. Found (percent): C, 76.01; H, 7.14; N, 4.95.

EXAMPLE 2

10-benzoyl-8,9,10,11,11a,12-hexahydro-7aH-pyrido[3',4':5,6]pyrano[3,2-f]quinolin-7a-ol

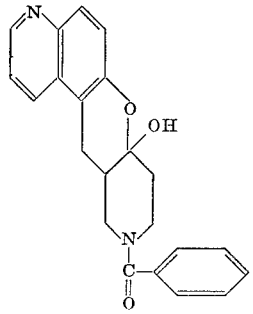

A solution of 14.9 g. of N-benzoyl-4-piperidone and 10 g. of pyrrolidine in 250 ml. of benzene is refluxed through a Dean-Stark trap for 5 hours. The benzene and excess pyrrolidine are removed in vacuo and the residual gum is dissolved in 70 ml. of dioxane. The solution is treated with 14.7 g. of 5-dimethylaminoethyl-6-quinolinol and refluxed for 4 days. After addition of 14 ml. of water, the mixture is refluxed for 2 hours and concentrated to a heavy gum in vacuo. The gum is recrystallized from ethanol, M.P. 249–52°; yield: 16 g. (89%); $\lambda_{max}$ m$\mu$ ($\epsilon$) 240 (48,400); $\nu_{max}$ 710 (m.), 825 (m.), 905 (ms.), 960 (ms.), 1075 (m.), 1150 (m.), 1225 (ms.), 1505 (m.), 1635 (s.), 3100 (m.) cm.$^{-1}$.

*Analysis.*—Calcd. for $C_{22}H_{20}N_2O_3$ (percent): C, 73.31; H, 5.59; N, 7.77. Found (percent): C, 73.31; H, 5.72; N, 7.70.

EXAMPLE 3

10-benzyl-8,9,10,11,11a,12-hexahydro-7aH-naphtho-[1′,2′:5,6]pyrano[3,2-c]pyridin-7a-ol

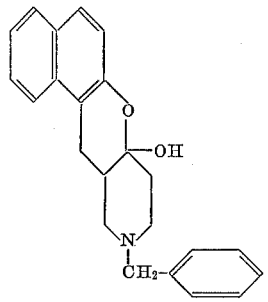

A solution of 10 g. of 1-dimethylaminomethyl-2-naphthol and 9 g. of 1-benzyl-4-piperidone in 50 ml. of dioxane is refluxed for 4 days. The solvent is removed in vacuo, and the residual gum dissolved in ethyl acetate and chromatographed on a column of 350 g. of Florisil, with ethyl acetate development. The fractions which are homogenous on thin layer chromatography are combined and evaporated to dryness. The residue is dissolved in absolute ethanol and treated with ethanolic HCl. The crystalline hydrochloride is filtered off and dissolved in water. The solution is made basic with 40% KOH. The precipitated base is filtered and recrystallized from acetonitrile to yield 10-benzyl-8,9,10,11,11a,12-hexahydro-7aH-naphtho-[1′,2′:5,6]pyrano[3,2 - c]pyridin - 7a - ol, M.P. 137.5–139.5°; $\lambda_{max}$ m$\mu$ ($\epsilon$) 231 (89,800), 266 (5100), 277 (5800), 288 (4300), 317 (2400), 331 (2600); $\nu_{max}$ 690 (m.), 735 (ms.), 810 (ms.), 970 (m.), 1020 (m.), 1175 (m.), 1225 (m.), 1595 (mw.), 1620 (mw.) cm.$^{-1}$.

*Analysis.*—Calcd. for $C_{23}H_{23}NO_2$ (percent): C, 79.97; H, 6.71; N, 4.06. Found (percent): C, 79.68; H, 6.68; N, 4.31.

EXAMPLE 4

10-benzoyl-8,9,10,11a,12-hexahydro-7aH-naphtho-[1′,2′:5,6]pyrano[3,2-c]pyridin-7aH-ol

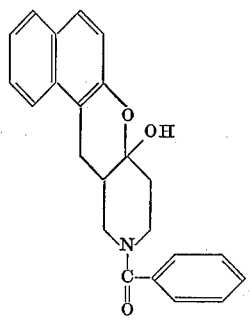

A solution of 10.15 g. of N-benzoyl-4-piperidone, and 7.1 g. of pyrrolidine in 250 ml. of benzene is refluxed through a Dean-Stark trap for 5 hrs. The benzene and excess pyrrolidine are evaporated in vacuo and the residual gum is taken up in 50 ml. of dioxane. The solution is treated with 10.05 g. of 1-dimethylaminomethyl-2-naphthol, refluxed for 6 days, treated with 10 ml. of water, and refluxed for 2 hrs. The solvents are removed in vacuo, and the residual gum is dissolved in ethyl acetate. The solution is chromatographed on a column of 400 g. of activated magnesium silicate such as "Florisil ®" with ethyl acetate development. The fractions which crystallize are combined and recrystallized from absolute ethanol to yield 10 - benzoyl - 8,9,10,11a,12 - hexahydro-7aH-naphtho[1′,2′:5,6]pyranol[3,2-c]pyridin - 7aH-ol, M.P. 192–194°; $\lambda_{max}$ m$\mu$ ($\epsilon$) 231 (86,800), 265 (6,000), 275 (6,000), 287 (4,800), 316 (2,200), 331 (2,700); $\nu_{max}$ 690 (ms.), 735 (ms.), 815 (ms.), 960 (ms.), 1035 (s.), 1160 (m.), 1230 (ms.), 1280 (ms.), 1500 (m.), 1600 (s.), 1610 (s.), 3275 (ms.) cm.$^{-1}$.

*Analysis.*—Calcd. for $C_{23}H_{21}NO_3$ (percent): C, 76.86; H, 5.89; N, 3.90. Found (percent): C, 77.12; H, 5.98; N, 3.75.

EXAMPLE 5

9-benzoyl-7a,8,9,10,11,11a-hexahydro-7H-pyrido-[3′,4′:5,6]pyrano[3,2-h]quinolin-11a-ol

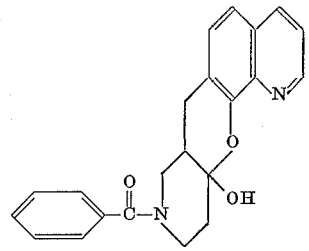

A solution of 10.15 g. of N-benzoyl-4-piperidone and 7.1 g. of pyrrolidine in 250 ml. of benzene is refluxed through a Dean-Stark water separator for 5 hrs. The benzene and excess pyrrolidine are removed in vacuo, and the gummy residue was dissolved in 50 ml. of dioxane. 7-dimethylaminomethyl-8-quinolinol (10.1 g.) is added, and the mixture is refluxed for 4 days, treated with 10 ml. of H$_2$O, refluxed for 2 hrs. and evaporated in vacuo, The residual gum is dissolved in ethyl acetate, and chromatographed on 300 g. of activated magnesium silicate, with ethyl acetate development. The fractions which crystallize on concentration are combined and recrystallized from acetonitrile to yield 9-benzoyl-7a,8,9,10,11,11a-hexahydro - 7H - pyrido[3′,4′:5,6]pyrano[3,2-h]quinolin-11a-ol, M.P. 159–161°; $\lambda_{max}$ m$\mu$ ($\epsilon$) 244 (57,000), 305 (2,880); $\nu_{max}$ 705 (ms.), 825 (ms.), 905 (s.), 1080 (s.), 1125 (m.), 1505 (m.), 1630 (s.), 3100 (m.) cm.$^{-1}$.

*Analysis.*—Calcd. for $C_{22}H_{20}N_2O_3$ (percent): C, 73.31; H, 5.59; N, 7.77. Found (percent): C, 73.36; H, 5.72; N, 7.98.

EXAMPLE 6

7,7a,8,9,10,11-hexahydro-9,11-dimethyl-11aH-naphtho-[2′,1′:5,6]pyrano[3,2-c]pyridine-11a-ol

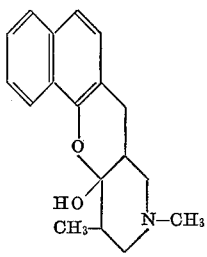

This compound is prepared in analogous fashion to 7,7a,8,9,10,11 - hexahydro - 9 - methyl-11aH-naphtho[2′,1′:5,6]pyrano[3,2-c]pyridin - 11a-ol from 12 g. of 2-dimethylaminomethyl-1-naphthol·HCl, and 9 g. of pyrrolidine enamine of 1,3-dimethyl-4-piperidone. The obtained material is recrystallized from acetonitrile, M.P. 175–179°; $\lambda_{max}$ m$\mu$ ($\epsilon$) 213 (40,300), 235 (41,000), 292 (4800), 310 (3300), 323 (3000); $\nu_{max}$ 745 (ms.), 810

(m.), 970 (s.), 1060 (s.), 1080 (vs.), 1150 (ms.), 1220 (m.), 1580 (m.), 1600 (mw.), cm.$^{-1}$.

Analysis.—Calcd. for $C_{18}H_{21}NO_2$ (percent): C, 76.29; H, 7.47; N, 4.94. Found (percent): C, 76.12; H, 7.50; N, 5.21.

EXAMPLE 7

7,7a,8,9,10,11-hexahydro-9-methyl-11aH-naphtho-[2',1':5,6]pyrano[3,2-c]pyridin-11a-ol

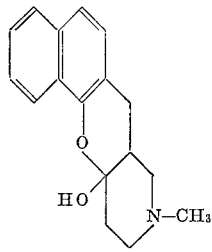

A solution of 20 g. of 2 - dimethylaminomethyl-1-naphthol·HCl in 30 ml. of $H_2O$ is made basic with conc. $NH_4OH$. The precipitated oil is extracted with four 25 ml. portions of chloroform; the combined extracts are dried over $Na_2SO_4$, and concentrated to a heavy oil in vacuo. This oil is taken up in 50 ml. of dioxane and combined with 14 g. of pyrrolidine enamine of N-methyl-4-piperidone. The mixture is refluxed for 4 hrs. under a stream of nitrogen, treated with 10 ml. of $H_2O$, refluxed one additional hour, and evaporated in vacuo. The residue is recrystallized from methanol with the aid of charcoal to yield 7,7a,8,9,10,11-hexahydro-9-methyl-11aH-naphtho-[2',1':5,6]pyrano[3,2-c]pyridin-11a-ol, M.P. 192–195°, $\lambda_{max}$ m$\mu$ ($\epsilon$) 213 (42,200), 234 (42,200), 291 (5,100), 309 (3600), 324 (3100); $\nu_{max}$ 740 (ms.), 805 (s.), 920 (s.), 1075 (s.), 1140 (ms.), 1260 (ms.), 1580 (m.), 1600 (mw.) cm.$^{-1}$.

Analysis.—Calcd. for $C_{17}H_{19}NO_2$ (percent): C, 75.81; H, 7.11; N, 5.20. Found (percent): C, 76.08; H, 7.20; N, 5.39.

EXAMPLE 8

8,9,10,11,11a,12-hexahydro-10-methyl - 12 - phenyl-7a(1-pyrrolidinyl) - 7aH - naphtho[1',2':5,6]pyrano[3,2-c]pyridine

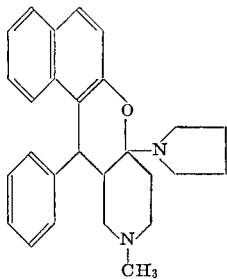

A solution of 13.5 g. of 1-($\alpha$-dimethylaminobenzyl)-2-naphthol, and 8.3 g. of pyrrolidine enamine of N-methyl-4-piperidone in 25 ml. of dioxane is refluxed under a stream of nitrogen for 4.5 hrs. The solvent is removed in vacuo, and the residual gum is crystallized from ethyl acetate to yield 8,9,10,11,11a,12-hexahydro-10-methyl-12 - phenyl-7a(1-pyrrolidinyl) - 7aH - naphtho[1',2':5,6]pyrano[3,2-c]pyridine; M.P. 203–207°; $\lambda_{max}$ m$\mu$ ($\epsilon$) 234 (67,000), 266 (5000), 277 (5700), 289 (4100), 317 (2300), 331 (3000); $\nu_{max}$ 700 (ms.), 750 (ms.), 810 (ms.), 915 (ms.), 1000 (ms.), 1225 (s.), 1605 (m.), 1625 (m.) cm.$^{-1}$.

Analysis.—Calcd. for $C_{27}H_{30}N_2O$ (percent): C, 81.37; H, 7.59; N, 7.03. Found (percent): C, 81.31; H, 7.55; N, 6.99.

EXAMPLE 9A 8,9,10,11,11a,12 - hexahydro-8,10-dimethyl-7aH-naphtho-[1',2':5,6]pyrano[3,2-c]pyridin-7a-ol prepared by Procedure A

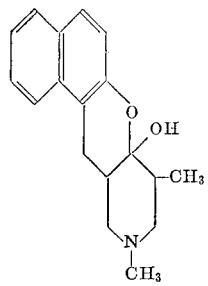

A solution of 8.9 g. of 1-dimethylaminomethyl-2-naphthol, and 8 g. of pyrrolidine enamine of 1,3-dimethyl-4-piperidone in 25 ml. of dioxane is refluxed under a stream of nitrogen for 4.5 hrs. The solution is then treated with 5 ml. of $H_2O$, refluxed for one additional hour and concentrated in vacuo. The residual gum is crystallized from EtOH to yield 8,9,10,11,11a,12-hexahydro-8,10-dimethyl - 7aH-naphtho[1',2':5,6]pyrano[3,2-c]pyridin-7a-ol, M.P. 164–170°.

EXAMPLE 9B 8,9,10,11,11a,12-hexahydro-8,10-dimethyl-7aH - naphtho-[1',2':5,6]pyrano[3,2-c]pyridin-7a-ol prepared by Procedure B A solution of 8.2 g. of 1,3-dimethyl-4-piperidone HCl in 20 ml. of $H_2O$ is made basic with 40% NaOH. The precipitated oil is extracted four times with 25 ml. portions of chloroform. The combined extracts are dried over $Na_2SO_4$, and concentrated to an oil in vacuo. The oil is dissolved in 50 ml. of dioxane; the solution is treated with 10 g. of 1-dimethylaminomethyl-2-naphthol and refluxed for one week. The solvent is removed in vacuo and the gummy residue is recrystallized from acetonitrile to give 8,9,10,11,11a,12 - hexahydro-8,10-dimethyl-7aH-naphtho[1',2':5,6]pyrano[3,2-c]pyridin-7a-ol, M.P. 165–167°; $\lambda_{max}$ m$\mu$ ($\epsilon$) 231 (80,000), 277 (5,100), 288 (4,000), 317 (2,000), 331 (2,400); $\nu_{max}$ 750 (ms.), 770 (ms.), 805 (s.), 890 (m.), 910 (ms.), 925 (ms.), 1010 (ms.), 1055 (ms.), 1115 (ms.), 1150 (ms.), 1220 (ms.), 1510 (m.), 1595 (m.), 1620 (m.) cm.$^{-1}$.

Analysis.—Calcd. for $C_{18}H_{21}NO_2$ (percent): C, 76.29; H, 7.47; N, 4.94. Found (percent): C, 76.37; H, 7.36; N, 4.78.

EXAMPLE 10

1,2,3,4,10,10a-hexahydro-2-methyl-4aH[1]benzopyrano[3,2-c]pyridin-4a-ol

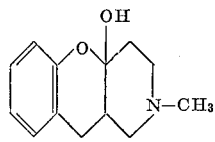

A solution of 7.55 g. of o-dimethylaminomethylphenol and 8.3 g. of pyrrolidine enamine of N-methyl-4-piperidone in 50 ml. of dioxane is refluxed for 2 weeks. The solution is treated with 10 ml. of $H_2O$, and refluxed for 2 hrs. The solvents are removed in vacuo and the gummy residue is recrystallized from acetonitrile to give 1,2,3,4, 10,10a - hexahydro - 2 - methyl - 4aH - [1]benzopyrano [3,2-c]pyridin-4a-ol, M.P. 144–46°; $\lambda_{max}$ m$\mu$ ($\epsilon$) 214 (78,300), 273 (21,200), 279 (21,000); $\nu_{max}$ 750 (m.s), 805 (m.), 930 (ms.), 970 (m.), 1050 (ms.), 1140 (s.), 1220 (s.), 1250 (ms.), 1585 (ms.), 1610 (mw.) cm.$^{-1}$.

Analysis.—Calcd. for $C_{13}H_{17}NO_2$ (percent): C, 71.20; H, 7.82; N, 6.39. Found (percent): C, 71.32; H, 7.82; N, 6.22.

EXAMPLE 11

8,9,10,11,11a,12-hexahydro-10-methyl-7aH-pyrido[3',4':5,6]pyrano[3,2-f]quinolin-7a-ol

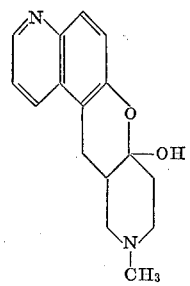

A solution of 5 g. of 5-dimethylaminomethyl-6-quinolinol and 4.1 g. of pyrrolidine enamine of N-methyl-4-piperidone in 25 ml. of dioxane is refluxed for 3 days. The solution is treated with 5 ml. of $H_2O$, refluxed 2 hrs. and evaporated in vacuo. The gummy residue is recrystallized from ethyl acetate, M.P. 164–66°, to yield 8,9,10,11,11a,12 - hexahydro - 10 - methyl - 7aH - pyrido - [3',4':5,6]pyrano[3,2-f]quinolin-7a-ol; $\lambda_{max}$ m$\mu$ ($\epsilon$) 240 (45,000), 285 (3200), 325 (3520); $\nu_{max}$ 810 (ms.), 935 (ms.), 960 (ms.), 1020 (s.), 1140 (ms.), 1230 (ms.), 1510 (m.), 1595 (m.), 1615 (m.), 3100 (ms.) cm.$^{-1}$.

Analysis.—Calcd. for $C_{16}H_{18}N_2O_2$ (percent): C, 71.09; H, 6.71; N, 10.36. Found (percent): C, 71.11; H, 6.69; N, 10.35.

EXAMPLE 12

3-bromo-8,9,10,11,11a,12-hexahydro-8,10-dimethyl-7aH-naphtho[1',2':5,6]pyrano[3,2-c]pyridin-7a-ol

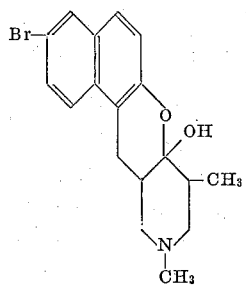

This compound is prepared by the same method as 8,9,10,11,11a,12 - hexahydro - 10 - methyl - 7aH-naphtho[1',2':5,6]pyrano[3,2-c]pyridin-7a-ol from 14 g. of 6-bromo-1-dimethylaminomethyl-2-naphthol, and 6.35 g. of 1,3-dimethyl-4-piperidone. The product is recrystallized from absolute ethanol, M.P. 205–207°; $\lambda_{max}$ m$\mu$ ($\epsilon$) 237 (72,000), 269 (5,600), 279 (6,000), 290 (3,900), 326 (2,000), 341 (2,300); $\nu_{max}$ 780 (m.), 815 (ms.), 880 (ms.), 910 (ms.), 925 (ms.), 1000 (ms.), 1055 (ms.), 1150 (ms.), 1260 (ms.), 1590 (m.), 1620 (m.) cm.$^{-1}$.

Analysis.—Calcd. for $C_{18}H_{20}BrNO_2$ (percent): C, 59.68; H, 5.56; N, 3.87. Found (percent): C, 59.93; H, 5.60; N, 4.14.

EXAMPLE 13

3-bromo-8,9,10,11,11a,12-hexahydro-10-methyl-7aH-naphtho[1',2':5,6]pyrano[3,2-c]pyridin-7a-ol

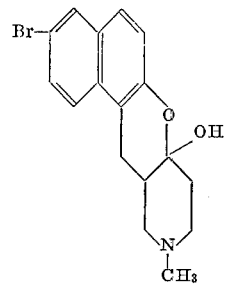

This compound is prepared by the same method as 8,9,10,11,11a,12 - hexahydro - 10 - methyl - 7aH - naphtho[1',2':5,6]pyrano[3,2-c]pyridin-7a-ol, from 12 g. of 6-bromo-1-dimethylaminomethyl-2-naphthol, and 4.85 g. of 1-methyl-4-piperidone. The product is recrystallized from absolute ethanol, M.P. 207–209°; $\lambda_{max}$ m$\mu$ ($\epsilon$) 237 (72,700), 269 (5,600), 280 (6,000), 290 (3,800), 325 (2,100), 340 (2,300); $\nu_{max}$ 750 (m.), 802 (s.), 875 (ms.), 980 (ms.), 1025 (s.), 1135 (m.), 1230 (s.), 1590 (m.), 1615 (mw.) cm.$^{-1}$.

Analysis.—Calcd. for $C_{17}H_{18}BrNO_2$: C, 58.63; H, 5.21; N, 4.02. Found (percent): C, 58.67; H, 5.29; N, 3.92.

EXAMPLE 14

8-benzoyl-6,7,8,9,9a,10-hexahydro-5aH-pyrano[3,2-b:5,6-c]dipyridin-5a-ol

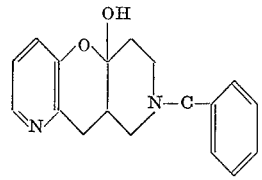

A solution of 30.3 g. of N-benzoyl-4-piperidone and 21.3 g. of pyrrolidine in 750 ml. of benzene is refluxed for 5 hrs. through a Dean-Stark water trap. The benzene and excess pyrrolidine are removed in vacuo and the residual gum is redissolved in 150 ml. of dioxane. The solution is treated with 22.8 g. of 2-(dimethylaminomethyl)-3-hydroxypyridine and refluxed for 13 days. The mixture is treated with 30 ml. of $H_2O$ and refluxed for 2 hrs. Removal of solvents in vacuo leaves a gummy residue which is recrystallized from absolute ethanol to yield 8-benzoyl - 6,7,8,9,9a,10 - hexahydro-5aH-pyrano[3,2-b:5,6-c]dipyridin-5a-ol; M.P. 176–178°; $\lambda_{max}$ m$\mu$ ($\epsilon$) 279 (6,700); $\nu_{max}$ 705 (m.), 805 (m.), 955 (ms.), 1030 (m.), 1100 (m.), 1275 (ms.), 1600 (mw.), 1625 (s.) cm.$^{-1}$.

Analysis.—Calcd. for $C_{18}H_{18}N_2O_3$ (percent): C, 69.66; H, 5.85; N, 9.03. Found (percent): C, 69.39; H, 5.70; N, 9.26.

EXAMPLE 15

1,2,3,4,10,10a-hexahydro-2-methyl-8-phenyl-4aH[1]benzopyrano[3,2-c]pyridin-4a-ol

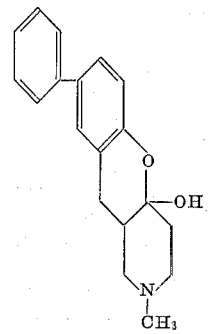

A solution of 5.65 g. of α-dimethylamino-4-phenyl-o-cresol, and 4.15 g. of pyrrolidine enamine of N-methyl-4-piperidone in 25 ml. of dioxane is refluxed 18 hrs. under a stream of nitrogen. The solution is treated with 5 ml. of H$_2$O, and refluxed 1 hr. more. The solvents are then removed in vacuo and the residue recrystallized from abs. EtOH to yield 1,2,3,4,10,10a - hexahydro-2-methyl-8-phenyl-4aH[1]benzopyrano[3,2-c]pyridin - 4a - ol; M.P. 181–183°; λ$_{max}$ mμ (ε) 261 (19,000); ν$_{max}$ 690 (ms.), 755 (ms.), 830 (ms.), 965 (ms.), 1025 (ms.), 1150 (m.), 1230 (ms.) cm.$^{-1}$.

*Analysis.*—Calcd. for C$_{19}$H$_{21}$NO$_2$ (percent): C, 77.26; H, 7.17; N, 4.74. Found (percent): C, 77.16; H, 7.16; N, 4.87.

EXAMPLE 16

8,9,10,11,11a,12-hexahydro-10-methyl-12-phenyl-7aH-naphtho[1',2':5,6]pyrano[3,2-c]pyridin-7a-ol

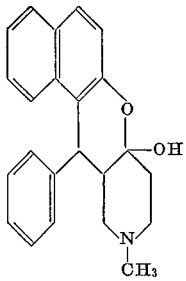

A solution of 4 g. of 8,9,10,11,11a,12-hexahydro-10-methyl - 12 - phenyl-7a-(1-pyrrolidinyl - 7aH - naphtho-[1',2':5,6]pyrano[3,2-c]pyridine in 30 ml. of dioxane and 40 ml. of 1 N HCl is refluxed for 18 hrs. The solution is then made basic in the cold with 10% NaOH solution and the precipitated product filtered, washed with cold H$_2$O, and recrystallized from abs. EtOH to yield 8,9,10,11,11a,12 - hexahydro - 10 - methyl - 12 - phenyl-7aH-naphtho[1',2':5,6]pyrano[3,2-c]pyridin-7a-ol; M.P. 192–195°; λ$_{max}$ mμ (ε) 232 (83,500), 266 (5900), 276 (7100), 288 (6000), 316 (3000), 330 (3500); ν$_{max}$ 695 (ms.), 745 (ms.), 815 (s.), 960 (ms.), 1020 (ms.), 1145 (ms.), 1230 (ms.), 1595 (mw.), 1620 (mw.) cm.$^{-1}$.

*Analysis.*—Calcd. for C$_{23}$H$_{23}$NO$_2$ (percent): C, 79.97; H, 6.71; N, 4.06. Found (percent): C, 79.90; H, 6.96; N, 4.06.

EXAMPLE 17

7,7a,8,9,10,11-hexahydro-9-methyl-11aH-pyrido[3',4':5,6]pyrano[3,2-h]quinolin-11a-ol

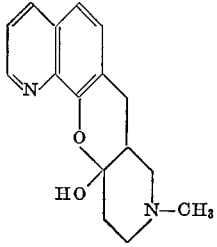

A solution of 10.1 g. of 7-dimethylaminomethyl-8-quinolinol and 5.6 g. of N-methyl-4-piperidone in 50 ml. of dioxane is refluxed for 1 wk. The solvent is removed in vacuo and the residual gum dissolved in ethyl acetate and chromatographed on a column of 400 g. of florisil, with ethyl acetate development. The fractions which crystallize on concentration are combined and recrystallized from ethyl acetate to yield 7,7a,8,9,10,11-hexahydro-9-methyl - 11aH - pyrido[3',4':5,6]pyrano[3,2-h]quinolin-11a-ol; M.P. 120–123°; λ$_{max}$ mμ (ε) 245 (45,100), 308 (3000); ν$_{max}$ 665 (m.), 790 (ms.), 830 (ms.), 925 (ms.), 1080 (s.), 1140 (ms.), 1215 (m.), 1505 (ms.), 1620 (mw.) cm.$^{-1}$.

*Analysis.*—Calcd. for C$_{16}$H$_{18}$N$_2$O$_2$ (percent): C, 71.09; H, 6.71; N, 10.36. Found (percent): C, 71.31; H, 6.81; N, 10.34.

EXAMPLE 18

6,7,8,9,9a,10-hexahydro-8-methyl-5aH-pyrano[3,2-b:5,6-c]dipyridin-5a-ol

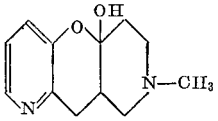

A solution of 7.6 g. of 2-dimethylaminomethyl-3-hydroxypyridine, and 8.3 g. of pyrrolidine enamine of N-methyl-4-piperidone in 50 ml. of dioxane is refluxed for 2 weeks. The solution is treated with 10 ml. of water, refluxed for 2 hrs. and evaporated in vacuo. The residual gum is recrystallized from acetonitrile to yield 6,7,8,9,9a,10 - hexahydro - 8 - methyl - 5aH - pyrano[3,2-b:5,6-c]dipyridin-5a-ol, M.P. 157–59.5°; λ$_{max}$ mμ (ε) 219 (6,000), 280 (5,920); ν$_{max}$ 800 (ms.), 995 (s.), 975 (ms.), 1025 (s.), 1105 (ms.), 1190 (ms.), 1215 (s.), 1250 (s.), 1580 (mw.), 1590 (mw.) cm.$^{-1}$.

*Analysis.*—Calcd. for C$_{12}$H$_{16}$N$_2$O$_2$ (percent): C, 65.43; H, 7.32; N, 12.72. Found (percent): C, 65.71; H, 7.44; N, 12.96.

EXAMPLE 19

8,9,10,11,11a,12-hexahydro-10-methyl-7a-(1-pyrrolidinyl)-7aH-naphtho[1',2':5,6]pyrano[3,2-c]pyridine

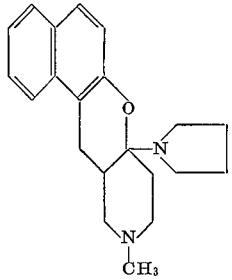

The solution of 5 g. of 1-dimethylaminomethyl-2-naphthol, and 4.15 g. of pyrrolidine enamine of 1-methyl-4-piperidone in 25 ml. of dioxane was refluxed for 3 hrs. under a stream of nitrogen. The solvent was removed in vacuo and the residual gum was recrystallized from Skelly B, to yield 8,9,10,11,11a,12-hexahydro-10-methyl-7a-(1-pyrrolidinyl) - 7aH - naphtho[1',2':5,6]pyrano[3,2 - c] pyridine; M.P. 101–05°; λ$_{max}$ mμ (ε) 231 (78,000), 266 (4000), 277 (4900), 288 (3900), 317 (2000), 331 (2500); ν$_{max}$ 750 (m.), 805 (s.), 880 (m.), 935 (m.), 980 (ms.), 1005 (ms.), 1150 (m.), 1235 (ms.), 1595 (m.), 1625 (m.) cm.$^{-1}$.

*Analysis.*—Calcd. for C$_{21}$H$_{26}$N$_2$O (percent): C, 78.22; H, 8.13; N, 8.69. Found (percent): C, 78.42; H, 8.21; N, 8.74.

EXAMPLE 20

1,2,3,4,10,10a-hexahydro-2,4-dimethyl-8-phenyl-4aH[1]-benzopyrano[3,2-c]pyridin-4a-ol

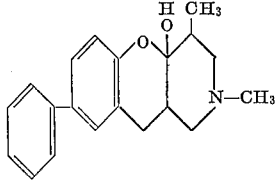

This was prepared from 11.35 g. of α-dimethylamino-4-phenyl-o-cresol and 9 g. of pyrrolidine enamine of 1,3-dimethyl-4-piperidone in analogous fashion to 1,2,3,4,10,10a-hexahydro-2-methyl - 8 - phenyl - 4aH[1]benzopyrano [3,2-c]pyridin-4a-ol. Recrystallized from acetonitrile, to yield 1,2,3,4,10,10a - hexahydro - 2,4 - dimethyl-8-phenyl-4aH[1]benzopyrano[3,2-c]pyridin-4a-ol; M.P. 163.5–66°; λ$_{max}$ mμ (ε) 262 (19,300); ν$_{max}$ 690 (s.), 755 (s.), 820 (s.), 975 (s.), 1045 (s.), 1135 (ms.), 1230 (s.), 1585 (mw.), 1600 (mw.), 1615 (mw.) cm.$^{-1}$.

3,549,641

13

*Analysis.*—Calcd. for $C_{20}H_{23}NO_2$ (percent): C, 77.64; H, 7.49; N, 4.53. Found (percent): C, 77.76; H, 7.62; N, 4.68.

It is understood that the foregoing detailed description is given merely by way of illustration and that many variations may be made therein without departing from the spirit of our invention.

Having described our invention, what we desire to secure by Letters Patent is:

1. A compound of the formula:

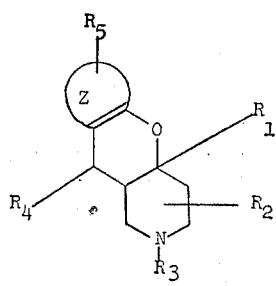

wherein $R_1$ is hydroxy or pyrrolidino; $R_2$ is hydrogen, alkyl of 1 to 6 carbon atoms; $R_3$ is hydrogen, alkyl of 1 to 6 carbon atoms, benzoyl and benzyl; $R_4$ is hydrogen or phenyl; Z is benzo, pyrido, naphtho, phenanthro, quinolo or isoquinolo; and $R_5$ is halogen or phenyl.

2. 8,9,10,11,11a,12 - hexahydro - 10 - methyl-7aH-naphtho[1,2':5,6]pyrano[3,2-c]pyridin-7a-ol.

3. 10 - benzoyl-8,9,10,11,11a,12 - hexahydro - 7aH-pyrido[3',4':5,6]pyrano[3,2-f]quinolin-7a-ol.

4. 10 - benzyl - 8,9,10,11,11a,12 - hexahydro-7aH-naphtho[1',2':5,6]pyrano[3,2-c]pyridin-7a-ol.

5. 10 - benzoyl - 8,9,10,11,11a,12 - hexahydro-7aH-naphtho[1',2':5,6]pyrano[3.2-c]pyridin-7aH-ol.

6. 9 - benzoyl - 7a,8,9,10,11,11a-hexahydro-7H-pyrido-[3',4':5,6]pyrano[3,2-h]quinolin-11a-ol.

7. 7,7a,8,9,10,11 - hexahydro - 9,11 - dimethyl-11aH-naphtho[2',1':5,6]pyrano[3,2-c]pyridine-11a-ol.

8. 7,7a,8,9,10,11 - hexahydro - 9 - methyl - 11aH-naphtho[2'1':5,6]pyrano[3,2-c]pyridin-11a-ol.

9. 8,9,10,11,11a,12 - hexahydro - 10-methyl-12-phenyl-7a - (1 - pyrrolidinyl) - 7aH - naphtho[1',2':5,6]pyrano-[3,2-c]pyridine.

10. 8,9,10,11,11a,12 - hexadydro - 8,10 - dimethyl-7aH-naphtho[1',2':5,6]pyrano[3,2-c]pyridin-7a-ol.

11. 1,2,3,4,10,10a - hexahydro - 2 - methyl-4aH-[1]benzopyrano[3,2-c]pyridin-4a-ol.

12. 8,9,10,11,11a,12 - hexahydro - 10 - methyl-7aH-pyrido[3',4':5,6]pyrano[3,2-f]quinolin-7a-ol.

13. 3 - bromo - 8,9,10,11,11a,12 - hexahydro-8,10-dimethyl - 7aH-naphtho[1',2':5,6]pyrano[3,2-c]pyridin-7a-ol.

14. 3 - bromo - 8,9,10,11,11a,12 - hexahydro-10-methyl - 7aH - naphtho[1',2':5,6]pyrano[3,2-c]pyridin-7a-ol.

15. 8 - benzoyl - 6,7,8,9,9a,10-hexahydro-5aH-pyrano-[3,2-b:5,6-c]dipyridin-5a-ol.

16. 1,2,3,4,10,10a - hexahydro - 2 - methyl - 8-phenyl-4aH[1]-benzopyrano[3,2-c]pyridin-4a-ol.

17. 8,9,10,11,11a,12 - hexahydro - 10 - methyl-12-phenyl - 7aH - naphtho[1',2':5,6]pyrano[3,2 - c]pyridin-7a-ol.

18. 7,7a,8,9,10,11 - hexahydro-9-methyl-11aH-pyrido-[3',4':5,6]pyrano[3,2-h]quinolin-11a-ol.

14

19. 6,7,8,9,9a,10 - hexahydro - 8 - methyl-5aH-pyrano-[3,2-b:5,6-c]dipyridin-5a-ol.

20. 8,9,10,11,11a,12 - hexahydro - 10 - methyl-7a-(1-pyrrolidinyl) - 7aH - naphtho[1',2':5,6]pyrano[3,2 - c] pyridine.

21. 1,2,3,4,10,10a - hexahydro - 2,4-dimethyl-8-phenyl-4aH[1]benzopyrano[3,2-c]pyridin-4a-ol.

22. Process for the production of a compound of the formula:

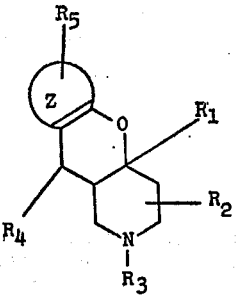

wherein $R_1$ is hydroxy or pyrrolidino; $R_2$ is hydrogen, alkyl of 1 to 6 carbon atoms; $R_3$ is hydrogen, alkyl of 1 to 6 carbon atoms, benzoyl and benzyl; $R_4$ is hydrogen or phenyl; Z is benzo, pyrido, naphtho, phenanthro, quinolo or isoquinolo; and $R_5$ is halogen or phenyl, which comprises heating a compound of the formula:

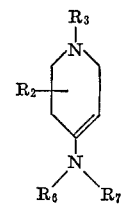

with an equivalent amount of a compound of the formula:

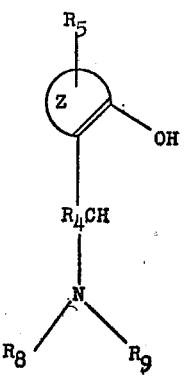

wherein $R_6$, $R_7$, $R_8$ and $R_9$ each represents lower alkyl, phenyl lower alkyl, phenyl or taken together with the nitrogen atom to which they are attached form a piperidino, morpholino or pyrrolidino nucleus, at a temperature of about 70 to 90° C., until no compound of the formula

is detectable.

23. Process for the production of a compound of the formula:

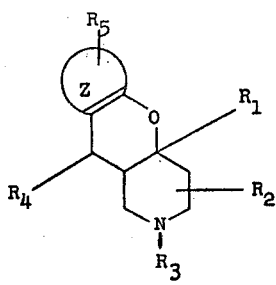

wherein $R_1$ is hydroxy or pyrrolidino; $R_2$ is hydrogen, alkyl of 1 to 6 carbon atoms; $R_3$ is hydrogen, alkyl of 1 to 6 carbon atoms, benzoyl and benzyl; $R_4$ is hydrogen or phenyl; Z is benzo, pyrido, naphtho, phenanthro, quinolo or isoquinolo; and $R_5$ is halogen or phenyl, which comprises heating a compound of the formula:

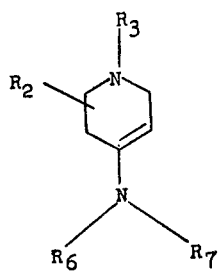

with an equivalent amount of a compound of the formula:

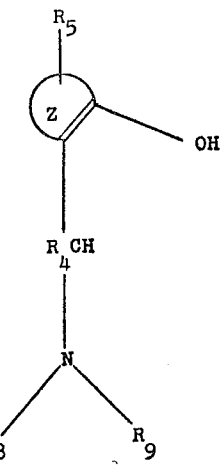

wherein $R_6$, $R_7$, $R_8$ and $R_9$ each represents lower alkyl, phenyl lower alkyl, phenyl or taken together with the nitrogen atom to which they are attached form a piperidino, morpholino or pyrrolidino nucleus; at a temperature of about 70 to 90° C. until no basic fumes are formed, adding water to the reaction mixture and continue heating at about 80 to 90° C. for about 60 to 70 minutes.

References Cited

Chem. Abstracts, vol. 63, 1965, 18059 d, e, f, and g relied on.

ALEX MAZEL, Primary Examiner

A. M. T. TIGHE, Assistant Examiner

U.S. Cl. X.R.

260—247.2, 247.5, 288, 294, 294.7, 296, 570.9;
424—248, 258, 263, 267